United States Patent
Decime

(10) Patent No.: US 7,509,683 B2
(45) Date of Patent: Mar. 24, 2009

(54) SYSTEM AND METHOD FOR AUTHENTICATING DIGITAL CONTENT

(75) Inventor: Jerry Decime, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1548 days.

(21) Appl. No.: 10/229,206

(22) Filed: Aug. 26, 2002

(65) Prior Publication Data

US 2004/0039929 A1    Feb. 26, 2004

(51) Int. Cl.
*H04L 9/32* (2006.01)
*H04L 9/00* (2006.01)
*H04K 1/00* (2006.01)

(52) U.S. Cl. .................. 726/26; 713/193; 711/152; 711/163; 711/164

(58) Field of Classification Search ............. 713/193; 726/26; 711/152, 163, 164
See application file for complete search history.

(56) References Cited

U.S. PATENT DOCUMENTS

| | | | | |
|---|---|---|---|---|
| 4,944,008 A * | 7/1990 | Piosenka et al. | ............. | 380/46 |
| 5,289,540 A | 2/1994 | Jones | ............. | 380/4 |
| 5,499,294 A * | 3/1996 | Friedman | ............. | 713/179 |
| 5,721,781 A * | 2/1998 | Deo et al. | ............. | 705/67 |
| 5,799,082 A | 8/1998 | Murphy et al. | ............. | 380/7 |
| 5,862,217 A * | 1/1999 | Steinberg et al. | ............. | 713/176 |
| 5,875,249 A * | 2/1999 | Mintzer et al. | ............. | 380/54 |
| 5,923,763 A * | 7/1999 | Walker et al. | ............. | 380/51 |
| 5,948,038 A * | 9/1999 | Daly et al. | ............. | 701/117 |
| 5,969,632 A * | 10/1999 | Diamant et al. | ............. | 340/5.3 |
| 6,005,936 A | 12/1999 | Shimizu et al. | ............. | 380/4 |
| 6,021,491 A * | 2/2000 | Renaud | ............. | 713/179 |
| 6,097,429 A * | 8/2000 | Seeley et al. | ............. | 348/154 |
| 6,175,924 B1 | 1/2001 | Arnold | ............. | 713/189 |
| 6,209,090 B1 * | 3/2001 | Aisenberg et al. | ............. | 713/178 |
| 6,209,097 B1 * | 3/2001 | Nakayama et al. | ............. | 713/193 |
| 6,212,633 B1 | 4/2001 | Levy et al. | ............. | 713/153 |
| 6,222,993 B1 | 4/2001 | Smart et al. | ............. | 396/6 |
| 6,263,438 B1 * | 7/2001 | Walker et al. | ............. | 713/178 |
| 6,282,362 B1 * | 8/2001 | Murphy et al. | ............. | 386/46 |
| 6,285,775 B1 * | 9/2001 | Wu et al. | ............. | 382/100 |
| 6,404,898 B1 * | 6/2002 | Rhoads | ............. | 382/100 |
| 6,510,520 B1 * | 1/2003 | Steinberg | ............. | 713/192 |
| 6,546,119 B2 * | 4/2003 | Ciolli et al. | ............. | 382/104 |
| 6,580,373 B1 * | 6/2003 | Ohashi | ............. | 340/901 |
| 6,583,813 B1 * | 6/2003 | Enright et al. | ............. | 348/150 |
| 6,587,948 B1 * | 7/2003 | Inazawa et al. | ............. | 713/193 |
| 6,587,949 B1 * | 7/2003 | Steinberg | ............. | 713/193 |
| 6,618,808 B1 * | 9/2003 | Johnson et al. | ............. | 726/4 |
| 6,691,226 B1 * | 2/2004 | Frank et al. | ............. | 713/100 |
| 6,704,867 B1 * | 3/2004 | Cordery | ............. | 713/165 |
| 6,738,899 B1 * | 5/2004 | Cordery | ............. | 713/156 |
| 6,831,990 B2 * | 12/2004 | Marvel et al. | ............. | 382/100 |
| 6,834,348 B1 * | 12/2004 | Tagawa et al. | ............. | 713/193 |
| 6,850,147 B2 * | 2/2005 | Prokoski et al. | ............. | 340/5.53 |
| 6,859,535 B1 * | 2/2005 | Tatebayashi et al. | ............. | 380/201 |

(Continued)

*Primary Examiner*—David Garcia Cervetti

(57) ABSTRACT

A system and method for authenticating digital content is described. In one implementation, digital content recorded by a recording device is stored in a secure section of a memory device. A control system is configured to block access to the digital content stored in the secure section except to permit one or more portions of the digital content to be transmitted to a certification and validation authority where the one or more portions of the digital content is maintained in a secure repository in the event the authenticity of the digital content is questioned.

33 Claims, 3 Drawing Sheets

U.S. PATENT DOCUMENTS

| | | | |
|---|---|---|---|
| 6,889,324 B1* | 5/2005 | Kanai et al. | 713/176 |
| 6,920,236 B2* | 7/2005 | Prokoski | 382/115 |
| 6,934,048 B2* | 8/2005 | Igarashi et al. | 358/1.15 |
| 6,944,313 B1* | 9/2005 | Donescu | 382/100 |
| 6,968,058 B1* | 11/2005 | Kondoh et al. | 380/200 |
| 7,047,405 B2* | 5/2006 | Mauro | 713/166 |
| 7,228,352 B1* | 6/2007 | Yaguchi et al. | 709/229 |
| 2001/0033661 A1* | 10/2001 | Prokoski | 380/258 |
| 2002/0042884 A1* | 4/2002 | Wu et al. | 713/201 |
| 2002/0046038 A1* | 4/2002 | Prokoski | 705/1 |
| 2003/0115474 A1* | 6/2003 | Khan et al. | 713/186 |
| 2003/0188117 A1* | 10/2003 | Yoshino et al. | 711/164 |
| 2004/0201751 A1* | 10/2004 | Bell et al. | 348/231.99 |

* cited by examiner

SYSTEM AND METHOD FOR AUTHENTICATING DIGITAL CONTENT

TECHNICAL FIELD

The present invention relates to authentication of digital content.

BACKGROUND

Digital content (photographs, audio recordings, etc.) produced by recording devices, such as cameras, audio recorders, digital evidence collection devices such as disk copiers and the like, are often "insecure" and are therefore "not trusted." As a result use of content from digital recording devices are not supported in evidentiary fields, such as law enforcement, medical, insurance, and other related fields. Currently, many civil and criminal courts in the United States refuse to admit digital content from recording devices into evidence, because the digital content can be manipulated and is, therefore, not considered reliable. That is, digital content is easily manipulated through digital manipulation software. Thus, a user generally has full access to the digital content after they are recorded by a recording device, which provides the opportunity to tamper with and manipulate the digital content.

Detecting whether digital content has been tampered with is extremely difficult and expensive. Either an image tamper detection system or an expert witness is needed to examine the digital content and attempt to deduce whether the images are original or have been altered. However, many image tamper systems and experts are unable to confirm whether digital content has, in fact, been tampered with. Moreover, the need to use tamper detection systems and expert witnesses is expensive, typically nullifying any efficiency cost savings gained by using digital recording devices.

Many in professional fields that require trusted evidence, such as law enforcement, insurance, medical and other related fields, have invested in digital equipment, because they purported to offer (i) instant imagery (the big advantage of digital cameras is that making photos is both inexpensive and fast because there is no film processing), (ii) convenient means of reproducing copies of digital content, and (iii) less expense over time. In reality, the conveniences associated with digital equipment are of no worth in evidentiary professional fields, because of the ease by which digital evidence is mutable, and therefore, unsustainable before most evidentiary entities.

SUMMARY

A system and method for authenticating digital content is described. In one implementation, digital content recorded by a recording device is stored in a secure section of a memory device. A control system is configured to block access to the digital content stored in the secure section except to permit one or more portions of the digital content to be transmitted to a certification and validation authority where the one or more portions of the digital content is maintained in a secure repository in the event the authenticity of the digital content is challenged.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Exemplary Digital Content Authenticity System

Figure 1:
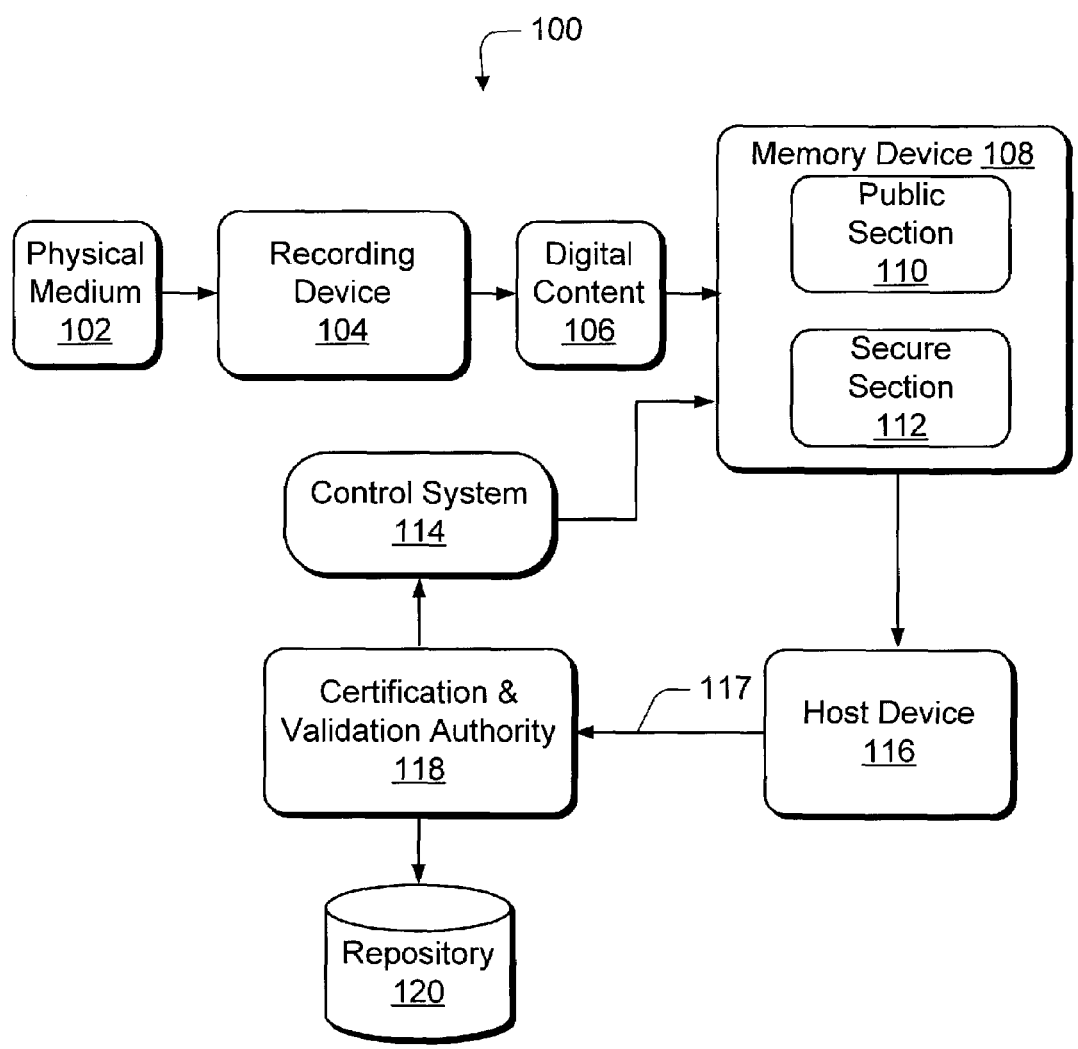
FIG. 1 is a block diagram that illustrates various components of an exemplary system for authenticating digital content recorded by a recording device.

FIG. 1 is a block diagram that illustrates various components of an exemplary system 100 for authenticating digital content 106 recorded by a recording device 104. It is expected that the various components of the authentication system 100 can be used in law enforcement, medicine, law, insurance industries and other areas.

In this example, the recording device 104 represents digital camera, but can include one or more other digital recording devices, such as an audio recorder, multifunctional digital/audio recorders, handheld devices or other related recording devices. Recording device 104 records digital content 106 of a physical medium 102. The digital content 106 forms digital representation of a physical medium 102.

Once the digital content 106 (e.g., photograph, voice recording, etc.) of a physical medium 102 is recorded by recording device 104, the digital content 106 of the physical medium 102 is stored in a memory device 108. In the exemplary implementation, memory device 108 represents a smart media card that is compatible with standard recording devices used with conventional smart media cards. Alternatively, the memory device 108 may represent other memory components, including a flash media card, random access memory (RAM), flash RAM, hard disk, floppy disk and other current and future various forms of storage media used in connection with recording devices 104.

Memory device 108 contains two primary storage sections: a public section 110 and a secure section 112. Information stored in the public section 110 can generally be downloaded freely to a host device connected to memory device 108, such as recording device 104 or a host device 116. The public section 110 can also be accessed in a normal capacity by a host device (such as a camera, computer, portable computer, etc.). As a result, most off-the-shelf products such as a camera, computer, or portable computer can be used with memory device 108.

The second primary storage area, secure section 112 is cordoned-off through a control system 114 that can operate within the memory device 108 or in conjunction with logic in memory device 108 and/or logic/software operating in another device, such as host device 116. When digital content 106 is recorded into memory device 108, a mirror image of the digital content from the public section 110 is retrieved and stored in secure section 112. Secure section 112 is configured to store encrypted data copied from the public section 110 through a memory system interface (to be described in greater detail below.)

Once stored in the secure section 112, control system 114 operating as logic in the memory device 108 and/or in conjunction with software and/or logic operating on one or more host devices 116 (that can include recording device 104), blocks access to the digital content 106 stored in the secure section 112. Through encryption and logic layers (to be described), the secure section 112 remains locked and off-limits to any device attempting to gain access to the information stored therein, other than through a special communication protocol established with a certification and verification authority (CVA) 118 (to be described in more detail). Information stored in the public section 110, however, can be retrieved, manipulated, written-to, and erased freely through the host device 116 (which can also serve as a docking station or in conjunction with a docking station). Digital content may be retrieved through the public section; however, such content is not certified by the CVA. As mentioned above, control system 114 uses a communication protocol through host device 116 to convey information stored in the secure section 112 to the CVA 118. The information that can be conveyed to CVA 118 can include the contents of the digital content 106 stored in secure section 112 or metadata or information associated with digital content 106. The metadata can include checksum data, header information such as date, time and location of the digital content, watermarks, and other indicia. The contents and/or the metadata can be used as a basis to compare whether digital content purporting to be an original copy of digital content (and possibly its associated metadata) is in fact identical to the contents and/or metadata retrieved from the secure section 112.

Control system 114 permits one or more portions of the digital content to be read and/or deleted from the secure section 112 of memory device 108, by an entity (such as host 116 or recording device 104), when the control system 114 receives an authorization reply from the CVA 118 acknowledging that the one or more portions of the digital content 106 were received. As used herein, one or more portions of the digital content and/or one or more portions of information/metadata associated with the digital content 106. As shall be explained in more detail, this can also include manifest data.

CVA 118 is an independent third party that provides a secure repository 120 for digital content received. CVA 118 generally keeps a permanent record of each transaction with a memory device 108 (via host devices if necessary). The repository 120 can be a secure database where digital content is stored in files that are indexed for possible retrieval at a subsequent date. Accordingly, CVA 118 maintains the one or more portions of the digital content 106 in a secure database, and if requested, is organized to produce the one or more portions of the digital content for evidentiary purposes in the event authenticity of particular digital content is questioned. The CVA 118 could establish a chain of custody from the time digital content is recorded until it is received and stored in the repository 120. The idea is to show that the digital content (or information associated with the digital content like checksum indicia) was "locked-up" and remained off-limits from the time it was recorded until the time it is stored in the repository 120. That way, if the authenticity of the digital content is challenged, the one or more portions of the digital content stored in the repository can be used to check whether the "purported original digital content" is identical to the one or more portions of the digital content maintained by the CVA.

In one implementation, in the event digital content must be validated, such as in the case of a court proceeding to challenge the integrity of the digital content, the CVA 118 can be contacted and a report containing secure checksum information can be obtained. If the CVA 118 also has the digital content or other evidence on record, it can be sent as part of the digital report.

Alternatively, it is also possible that the CVA 118 could send a human representative to testify as to the chain of custody of the one or more portions of the digital content maintained by the CVA 118. Additionally, the CVA representative aided by digital report or computer system could quickly compare a purported original digital content, to information maintained by the CVA to determine whether the purported original digital content was altered subsequent to its being recorded by the recording device 104.

Figure 2:
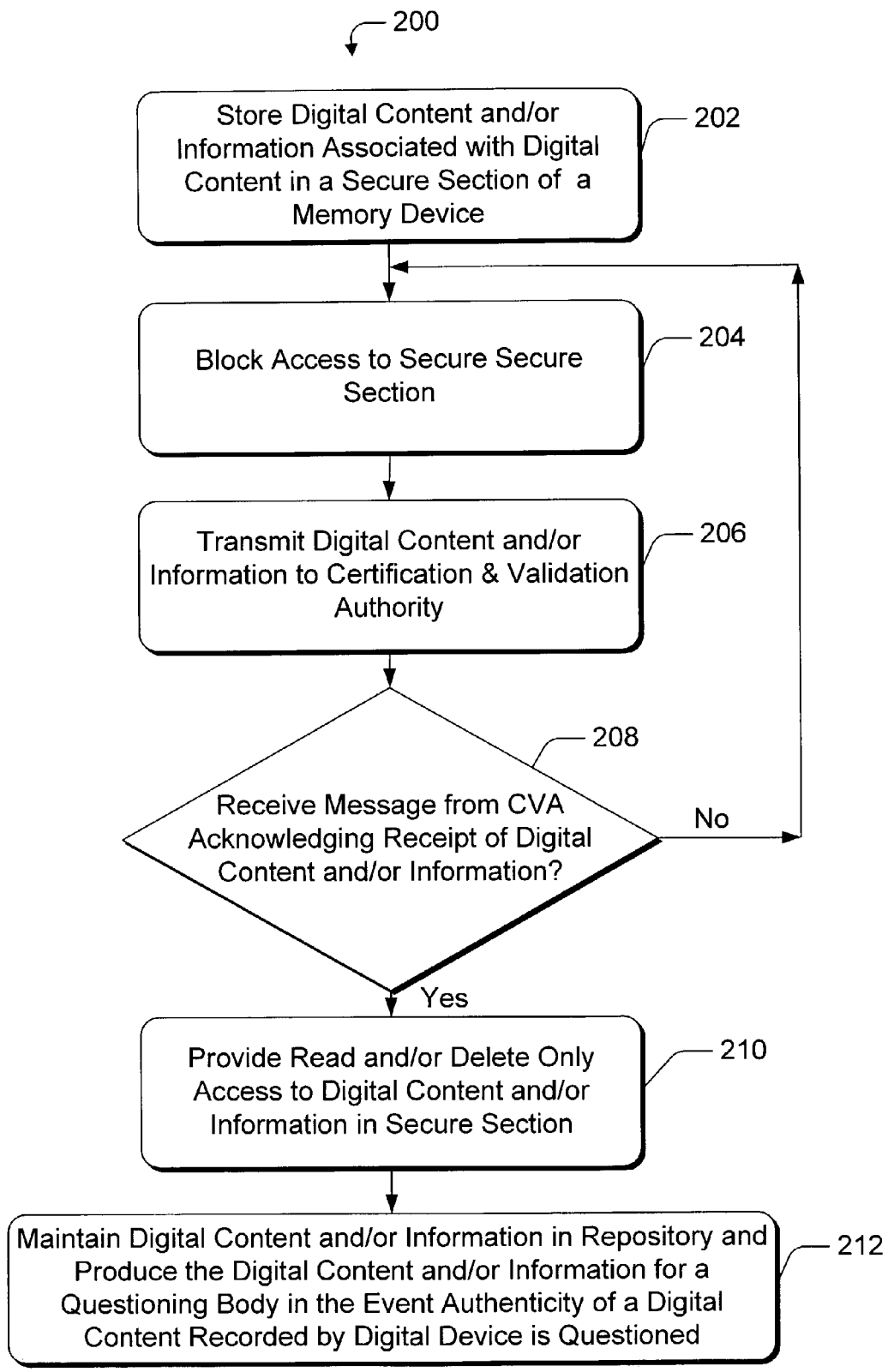
FIG. 2 is a flow diagram that illustrates a method for authenticating digital content.

FIG. 2 is a flow diagram that illustrates a method 200 for authenticating digital content. Method 200 is performed by system 100 (or some portion thereof). This methodological implementation may be performed in software, hardware, or a combination thereof.

At a block 202, digital content 106 and/or information associated with digital content is stored in secure section 112 of memory device 108. As used herein, information associated with the digital content can include checksum data, and metadata (such as date, time, and global position of where the digital content was obtained, etc.). This associated information provides additional proof appurtenant to the digital content.

At a block 204, control system 114 blocks access to the digital content 106 and/or associated information stored in secure section 112. At a block 206, the digital content and/or associated information is transmitted to CVA 118 via a host device 116. Control system 114 recognizes the host device 116 and permits the host device 116 to perform a read only operation when attempting to convey the digital content 106 or associated information to the CVA 118. The communication channel 117 used between the memory device 108 (via host 116) and CVA 118 can use strong encryption (preferably at least 128 bit encryption) to ensure security of the data being transferred.

At a block 208, control system 114 waits for the CVA 118 to send a response acknowledging receipt of the digital content 106 and/or associated information. If at block 208, the control system 114 does not receive an acknowledgement from the CVA 118, the control system continues to block a host from gaining access (other than to resend the digital content/information to the CVA) to the digital content 106 and/or information. If at block 208, the control system 114 receives a message from CVA 118 acknowledging receipt of the digital content and/or associated information, then at a block 210, control system 114 permits read and/or delete only access to that specific digital content and/or information received by the CVA 118.

At a block 212, the CVA 118 maintains the digital content and/or associated information in a secure repository 120. The database is inaccessible to the public. The CVA 118 is organized to produce the digital content 106 and/or associated information for a questioning body (e.g. a court, law enforcement agency, insurance agency, etc.), in the event that the authenticity of digital content, purporting to be unaltered, is questioned.

Detailed Authentication System Implementation

Figure 3:
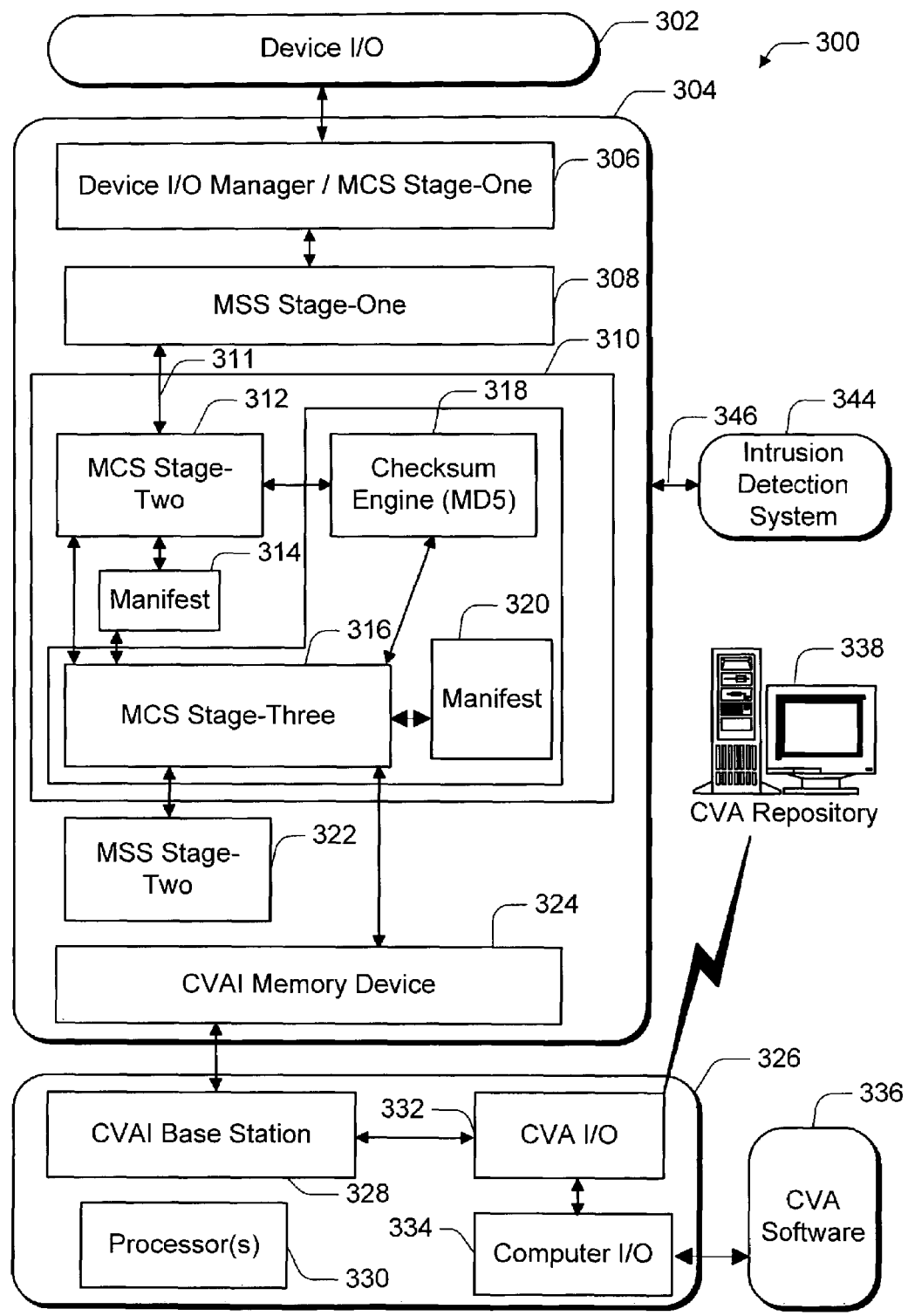
FIG. 3 shows various components of another exemplary authentication system.

FIG. 3 shows various components of another exemplary authentication system 300. System 300 is similar to system 100 described with reference to FIGS. 1 and 2. System 300 includes a recording device input/output interface 302, a memory device 304, a trusted interface system 326, and a CVA repository 338. Authentication system 300 ensures that digital content 106 recorded by a recording device can be certified as authentic.

Memory device 304 includes a device I/O manager (or management control system stage one (MCS stage-one)) 306 that is used to interface with a device I/O 302 of a recording device. The device I/O and MCS 306 interact with each other in a normal state, unaware that this memory device 304 includes multi-sections and layers. A memory storage system (MSS) (stage-one) 308 is completely host control interface readable and writeable. Through MCS-stage one 306, MSS 308 interacts with the recording device I/O 302 in a fully readable and writeable format. However, all interaction with MSS stage-one 308 is logged in a manifest 314, and rename, delete, or erase functions are obfuscated through the use of dummy files.

In the event that MSS-stage-one 308 receives a delete file request from a host device, the file is erased in MSS stage-one; however, a dummy file of the same size is immediately re-written to MSS stage-one 308 and the memory manifest 314 is updated. This dummy file serves as a "place holder" for unsecured files that are stored in MSS stage two 312 and cannot be erased until it is approved for deletion by the CVA 118. In the event that MSS stage-one 308 receives a rename command, the file in memory is renamed and the rename command is recorded in a secure manifest 320.

A second memory storage layer, MSS stage-two 322, is writable through a memory control system (MCS) stage-two 312 and MCS stage-three 316. Through the MCS 312 and MCS 316, any digital content placed in MSS stage-one 308 is automatically moved into MSS stage-two 322. When this transfer occurs, information associated with digital content is recorded as metadata in a manifest 320. The information can include a date and time from recording device, date and time in the memory device 304, location information obtained through a global positioning system (not shown), digital content size, digital content name, strong checksum such as Message-Digest Algorithm version five (MD5) of the non-encrypted digital content in the public section, and a strong checksum of the encrypted digital content.

Exemplary Encryption & Checksum Engine

In one implementation of memory device 304, at least a 128-bit encryption is used to encrypt data from MSS stage-one 308 for storage in an encrypted form with MSS stage-two 322. Encryption is used to ensure secure storage and communication within the memory device 304 in the event the memory device 304 is compromised. Furthermore, a strong checksum engine 318 is used for providing checksum for data in MSS stage-one 308 and MSS stage-two 322. These checksums are stored as part of the manifest 320. A strong checksum technology, such as MD5 is used to check the data contained in the two MSS stages 308 and 322.

Exemplary Memory Control System

MCS 306, MCS 312 and MCS 316 obfuscates the secure nature of the device 304 as described above by hiding MCS stage-two 312. MCS stage-one 306 is responsible for interactions solely with the device I/O 302 and is logically removed from MCS stage-two 312 to prevent a means for user intrusion into MSS stage-two 312. However, a simple communication channel 311 is maintained between MCS stage-one 306 and MCS stage-two 312 for the communication of file sizes upon request from MCS stage-one 308.

In MCS stage-two 312 movement of digital content from MSS stage-one 308 to MSS stage-two 322 is managed as well as the interaction with the checksum engine 318 and manifests 314 and 320 within an encrypted environment. The MCS stage-two 312 has read-only access to MSS stage-one 308. MSS stage-one 308 issues read requests to MCS stage-two 312 so that it may obtain the digital content contained within MSS stage-one for writing into MSS stage-two 322. MCS stage-two 312 has full write access to MSS stage-two 322. As mentioned above, MCS stage-two 312 is not logically connected to MCS stage-one 308 beyond a simple communication channel 311 for the communication of file sizes in the event that a delete command is issued through the host control interface 302 for deletion of digital stored in MSS stage-one 308.

MCS stage-three 316 controls movement of digital content from MSS stage-two 322 to the CVA host control interface 324 of the memory device for communication to the CVA control interface at the docking device 326. MCS stage-three 316 is not logically connected to either the MCS stage-one 306 or MCS stage-two 312 beyond a simple communication channel to MCS stage-two 312 for the communication of digital content delete requests to MCS stage-two 312.

Both the MCS stage-two 312 and MCS stage-three 316 operate within an encrypted environment of at least 128-bit encryption so that the software and communication channels within these components cannot be observed or changed by unauthorized users.

Secure Manifest

Secure manifests 314 and 320 are proprietary data files that contain metadata pertaining to the interactions of the system 300. Manifest 320 contains information such as digital content type, file name, non-encrypted size, encrypted size, non-encrypted checksum, encrypted checksum, number of delete attempts, intrusion detection data, and any other information that may be necessary as part of the digital content authentication process. Other data such as the inclusion of location information at the time the digital content was captured by the recording device could also be supplied through an onboard Global Positioning System (GPS) (not shown) (either in the memory device 304 or recording device).

The manifests 314 and 320 are managed in two stages. The manifest controlled by MCS stage two interfaces with MCS stage-one 306 for the writing of data. MCS stage-one 306 does not have delete privileges to the manifest controlled by MCS stage-two. All data within The MCS stage-one manifest is transferred to manifest 320 through the use of MCS stage-three 316 to logically separate the manifest used by MCS stage-two from the manifest used by MCS stage-three 320. The data within manifest used by MCS stage-two is moved to the manifest used by MCS stage-three at the termination of a write command as notified by MCS stage-two to MCS stage-three. Any data changes that occur as the result of a delete issuance recorded in the MCS stage-two manifest is recorded in the MCS stage-three manifest 320 through appending the manifest with the update information contained within the MCS stage-two manifest 314. Once again, delete commands by MCS stage-two 312 in this implementation are not performed to either manifest. Manifest 320 interfaces with MCS stage-three 316 for the write of the final metadata generated by the MCS stage-three process as well as for the deletion of the data contained within manifest 320. Manifests contained within 314 and 320 operate within in an encrypted environment of 128-bit encryption or more, so that the software and communication channels within these components cannot be observed or changed by unauthorized users.

Date Time System

A date time system (not shown) consists of a clock that is set by the CVA 118 through CVA interface 332 at the time that memory device 304 is synchronized with the CVA repository 338. Alternatively, if used with a packet network or GPS system, the data and time can be synchronized with such services; however, time acquired through such services would be stored as a secondary time metadata entry in the manifest 320 to avoid external tampering with the time system through the use of GPS or packet network transmission devices.

Intrusion Detection System

An intrusion detection system 344 can be implemented within the encrypted sections 310 of memory device 304 or in combination with a host device. The intrusion detection system 344 monitors communication channels in a read-only manner and is designed to detect abnormalities and pass these to manifest 320 through a communication channel 346.

Certification and Validation Authority Interface (CVAI)

A CVAI memory device 324 interfaces with MCS stage-three 316 and host device 326. A base station 328 is used to ensure that a secure interface is achieved between memory device 324 and base station 328. Base station 328 communicates in a read-only and delete-only mode with MCS stage-three 316. Any data or evidence in MSS stage-two 322 is transferred through the base station 328 to the host device 326. The host device 326 uses CVA software 336, which connects to the CVA repository 338 for transfer of secure checksum and/or the digital content. At a point when the information associated with the digital content (e.g., checksum, etc.), and/or the digital content itself are transferred to the CVA repository 338, base station 328 instructs the CVA software 336 to write the content from MSS stage-two 322 to the host device 326 that will contain a record of the information and issues a delete require to MCS stage-three 316 after the digital content or associated information is written and successfully check-summed on the host device 326. Host device 326 can use an optional network connection such as 10/base-T for communication with the CVA to secure the transfer protocol.

Certification and Validation Authority

The CVA is a trusted third-party that maintains a record or secure checksums, manifests and/or digital content. As part of initializing the CVA software 336 on host device 326, a user registers with the CVA 118. This registration includes the transfer of the internal serial number of the memory device, the recording of the user information such as name, address and payment information. The CVA would likely as part of their business model charge a monthly fee which could be flat-rate or based on the amount of evidence that is certified. The CVA maintains a private key collection that is tied to the individual serial numbers of each of the memory devices 304, so that every memory device 304 has a unique private key to avoid the pitfalls associated with the possibility of the discovery of a single key.

The CVA can also flash the internal software/logic contained in the memory device 304, base station 328 or update the software 336 contained with the host device 326. Processor(s) 330 executing logic or CVA software 336 transferred through some type of I/O 334 provide the functionality for host device 326.

Based on the forgoing exemplary implementations, professional fields that require trusted evidence can use digital technologies, which are as secure or more secure than existing methods of evidence storage such as cassette tape or traditional photographs. There is no need to use special security devices for the collection of data. Standard off-the shelf equipment can be used.

Additionally, the foregoing implementations provide a trusted source for validation of forensic evidence that is relatively inexpensive as compared to the traditional use of an expert witnesses trained in fraud diction. To validate the forensics, digital content is presented exactly it was collected, by having a questioning body (attorneys in court proceedings, agencies, law enforcement, etc.) request a written or digital report form the CVA. The CVA information could either prove or disprove the validity of the digital content purported to be original (unmodified). The information would either prove or disprove the validity of the purported digital content through checksums of that purported original.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system for authenticating digital content recorded by a recording device; comprising: a memory device including a secure section configured to store the digital content, and a control system configured to block access to the digital content stared in the secure section except to permit one or more portions of the digital content to be transmitted to a certification and validation authority where the one or more portions of the digital content is maintained in a secure repository if the authenticity of the digital content is questioned.

2. The system as recited in claim 1, wherein the control system is further configured to permit one or more portions of the digital content to be read and/or deleted from the secure section of the memory device by an entity other than the certification and validation authority, when the control system receives an authorization reply from the certification and validation authority acknowledging that the one or more portions of the digital content were received.

3. The system as recited in claim 1, wherein the certification and validation authority maintains the one or more portions of the digital content in a secure database, and if requested, is organized to produce the one or more portions of the digital content for evidentiary purposes in the event the authenticity of the digital content is questioned.

4. The system as recited in claim 1, wherein the memory device further includes a public section configured to store the digital content so that the digital content is accessible to host devices.

5. The system as recited in claim 1, further comprising a secure communication channel interface to transmit the one or more portions of the digital content to the certification and validation authority.

6. The system as recited in claim 1, wherein the recording device is one of a camera, a computer, a portable device and a digital audio recorder.

7. The system as recited in claim 1, wherein the memory device is a memory card.

8. The system as recited in claim 1, wherein the one or more portions of the digital content include metadata associated with digital content.

9. A system for authenticating digital content recorded by a recording device, comprising: a memory device having a secure section configured to store one or more portions of the digital content; and a control system configured to block access to the one or more portions of the digital content stored in the secure section and permit metadata associated wit the one or more portions of the digital content to be transmitted to a certification and validation authority.

10. The system as recited in claim 9, wherein the control system is further configured to permit one or more portions of the digital content to be read and/or deleted from the secure section of the memory device by an entity other than the certification and validation authority, when the control system receives an authorization reply from the certification and validation authority acknowledging that the metadata was received.

11. The system as recited in claim 9, wherein the certification and validation authority maintains the metadata in a secure database, and if requested, is organized to product the metadata for evidentiary purposes.

12. The system as recited in claim 9, wherein the memory device further includes a public section configured to store the digital content so that the digital content is accessible to host devices.

13. The system as recited in claim 9, further comprising a secure communication channel interface to transmit the metadata to the certification and validation authority.

14. The system as recited in claim 9, wherein the recording device is one of a camera, a computer, a portable device and a digital audio recorder.

15. The system as recited in claim 9, wherein the memory device is a memory card.

16. A memory device for a digital recording device, comprising:
   a public section configured to store digital content received from the digital recording device and permit other devices connected to the memory device, direct access to the digital content stored therein; and
   a secure section also configured to store the digital content received from the digital recording device prior to being retrieved from the memory device, the secure section configured to block access to the digital content stored in the secure section until the digital content is conveyed to a certification and validation authority and the certification and validation authority acknowledges receipt of the digital content.

17. The memory device as recited in claim 16, wherein the security section includes a manifest configured to store metadata associated with the digital content received from the recording device.

18. The memory device as recited in claim 16, further comprising interface logic configured to provide read and delete only access between the secure section of the memory device and a host device, after the certification and validation authority acknowledges receipt of the digital content.

19. The memory device as recited in claim 16, further comprising an intrusion detection system configured to monitor communication to and from the secure section and record potential security abnormalities in a manifest.

20. The memory device as recited in claim 16, wherein an encrypted communication channel is established between the memory device and the certification and validation authority.

21. The memory device as recited in claim 16, wherein the secure section is contained on a memory card.

22. An authentication system, comprising:
   a memory device, configured to maintain an image recorded by a digital device in a secure region of the memory device; and
   a certification and validation authority, configured to receive information associated with the image read from the secure region of the mermory device, and maintain the information in a database in the event that authenticity of the image recorded by the digital device is questioned.

23. The authentication system as recited in claim 22, where the information includes metadata associated with the image.

24. The authentication system as recited in claim 22, wherein Loc information includes checksum data.

25. The authentication system as recited in claim 22, wherein the information includes global positioning information.

26. The authentication system as recited in claim 22, further including a host device operating software configured to interface with the memory device and the certification and validation authority.

27. The authentication system as recited in claim 22, wherein the certification and validation authority is further configured to receive a copy of the image from the secure region of the memory device and maintain the image in a database in the event that the authenticity of the image recorded by the digital device is questioned.

28. A method for authenticating digital content recorded by a digital recording device, comprising:
   storing the digital content in a secure section of a memory device;
   restricting access to the digital content in the secure section; and
   transmitting to a certification and validation authority, one of (i) information associated with the digital content, (ii) the digital content and (iii) information associated with the digital content and the digital content, wherein the certification and validation authority serves as a secure repository in the event authenticity of the digital content is questioned.

29. The method as recited in claim 28, Farther comprising permitting access to the restricted access to the digital content in the secure section, after the certification and validation authority acknowledged receipt of the one of (i) information associated with the digital content, (ii) the digital content and (iii) information associated with the digital content and the digital content, 30. The method as recited in claim 28, wherein the information associated with the digital content includes metadata that can be used for checksum purposes.

31. A recording device comprising:
   a memory device configured to store a digital content recorded by the recording device; and
   a control system configured to block access to the digital content stored in the memory device until a copy of the digital content has been transmitted to a certification and validation authority.

32. The recording device of claim 31, where the control system is further configured to block access to the digital content stored in the memory device until an acknowledgment message is received from the certification and validation authority.

33. The recording device as recited in claim 31, wherein the recording device is one of a camera, a computer, a portable device and a digital audio recorder.

* * * * *

UNITED STATES PATENT AND TRADEMARK OFFICE
CERTIFICATE OF CORRECTION

PATENT NO. : 7,509,683 B2  
APPLICATION NO. : 10/229206  
DATED : March 24, 2009  
INVENTOR(S) : Jerry Decime Page 1 of 1

It is certified that error appears in the above-identified patent and that said Letters Patent is hereby corrected as shown below:

In column 8, line 13, in Claim 1, delete "stared" and insert -- stored --, therefor.

In column 8, line 53, in Claim 9, delete "wit" and insert -- with --, therefor.

In column 9, line 51, in Claim 22, delete "mermory" and insert -- memory --, therefor.

In column 10, line 2, in Claim 24, delete "Loc" and insert -- the --, therefor.

In column 10, line 30, in Claim 29, delete "Farther" and insert -- further --, therefor.

In column 10, line 35, in Claim 29, delete "content," and insert -- content. --, therefor.

Signed and Sealed this

Twenty-fifth Day of August, 2009

David J. Kappos  
*Director of the United States Patent and Trademark Office*